(12) United States Patent
Chen

(10) Patent No.: US 8,204,371 B2
(45) Date of Patent: Jun. 19, 2012

(54) BACK FOCUS ADJUSTMENT APPARATUS

(75) Inventor: Shi-Ying Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 51 days.

(21) Appl. No.: 12/906,028

(22) Filed: Oct. 15, 2010

(65) Prior Publication Data
US 2012/0033956 A1    Feb. 9, 2012

(30) Foreign Application Priority Data
Aug. 4, 2010    (CN) .......................... 2010 1 0245116

(51) Int. Cl.
G03B 3/00 (2006.01)
G03B 13/18 (2006.01)
(52) U.S. Cl. .............................. 396/89; 396/75; 396/133
(58) Field of Classification Search .................... 396/72, 396/74, 89, 133, 144, 75
See application file for complete search history.

(56) References Cited

U.S. PATENT DOCUMENTS

| | | | | |
|---|---|---|---|---|
| 4,225,219 A * | 9/1980 | Shimizu | ............................ | 396/71 |
| 4,447,837 A * | 5/1984 | Hirata et al. | ................... | 386/200 |
| 4,495,527 A * | 1/1985 | Kozuki et al. | ................. | 386/224 |
| 4,669,848 A * | 6/1987 | Wakabayashi | ................... | 396/75 |
| 4,796,045 A * | 1/1989 | Hamanishi et al. | ........... | 396/137 |
| 4,887,109 A * | 12/1989 | Fujita et al. | ..................... | 396/379 |
| 5,005,038 A * | 4/1991 | Ogawa et al. | ................... | 396/75 |
| 6,924,940 B2 * | 8/2005 | Koga et al. | ..................... | 359/694 |

* cited by examiner

Primary Examiner — Clayton E Laballe
Assistant Examiner — Warren Fenwick
(74) Attorney, Agent, or Firm — Altis Law Group, Inc.

(57) ABSTRACT

A back focus adjustment apparatus of a camera includes a casing, an adjusting module and an image capturing device. The adjusting module includes a fixed support, a movable support and a drive module. The drive module includes an adjustment wheel and two drive wheels. The lens module is mounted on a bottom surface of the casing. The fixed support is fixed in the casing and opposite to the bottom surface thereof. The image capturing device is mounted on the movable support. The drive module is defined on the fixed support. The drive module is connected to the movable support through worm gears defined on drive wheels. The drive wheels and the adjustment wheel are gearingly engaged. The image capturing device moves back and forth according to the adjustment of the adjusting wheel of the adjusting module.

12 Claims, 3 Drawing Sheets

BACK FOCUS ADJUSTMENT APPARATUS

BACKGROUND

1. Technical Field

The disclosure relates generally to camera modules, and more particularly to a back focus adjustment apparatus of a camera.

2. Description of the Related Art

Adjusting the focus of a camera is a priority for capturing clear photos. However, a back focus adjustment apparatus of the camera is normally difficult to assemble. Therefore, there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
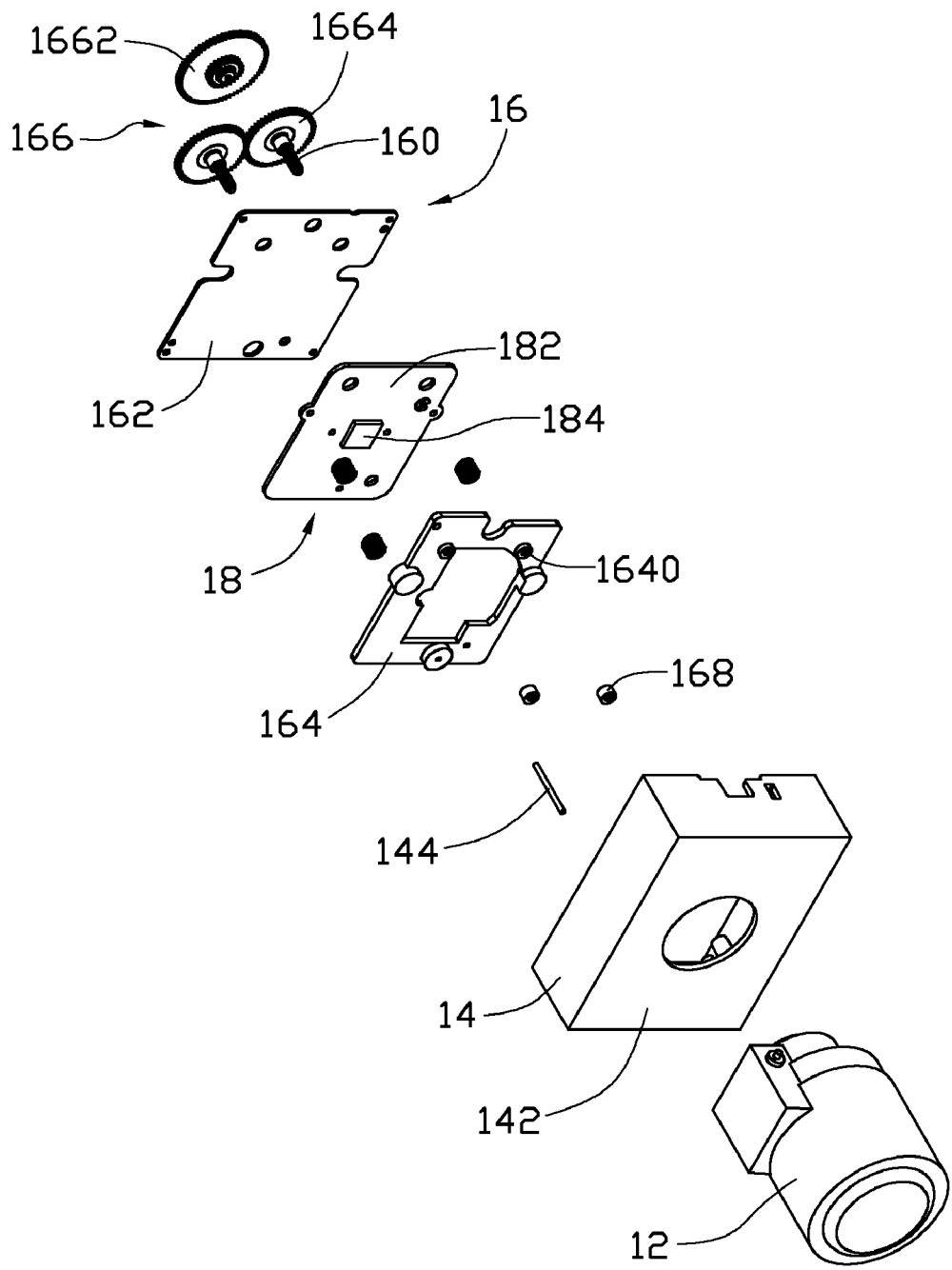
FIG. 1 is an exploded view of a back focus adjustment apparatus in accordance with one embodiment of the disclosure.
Figure 2:
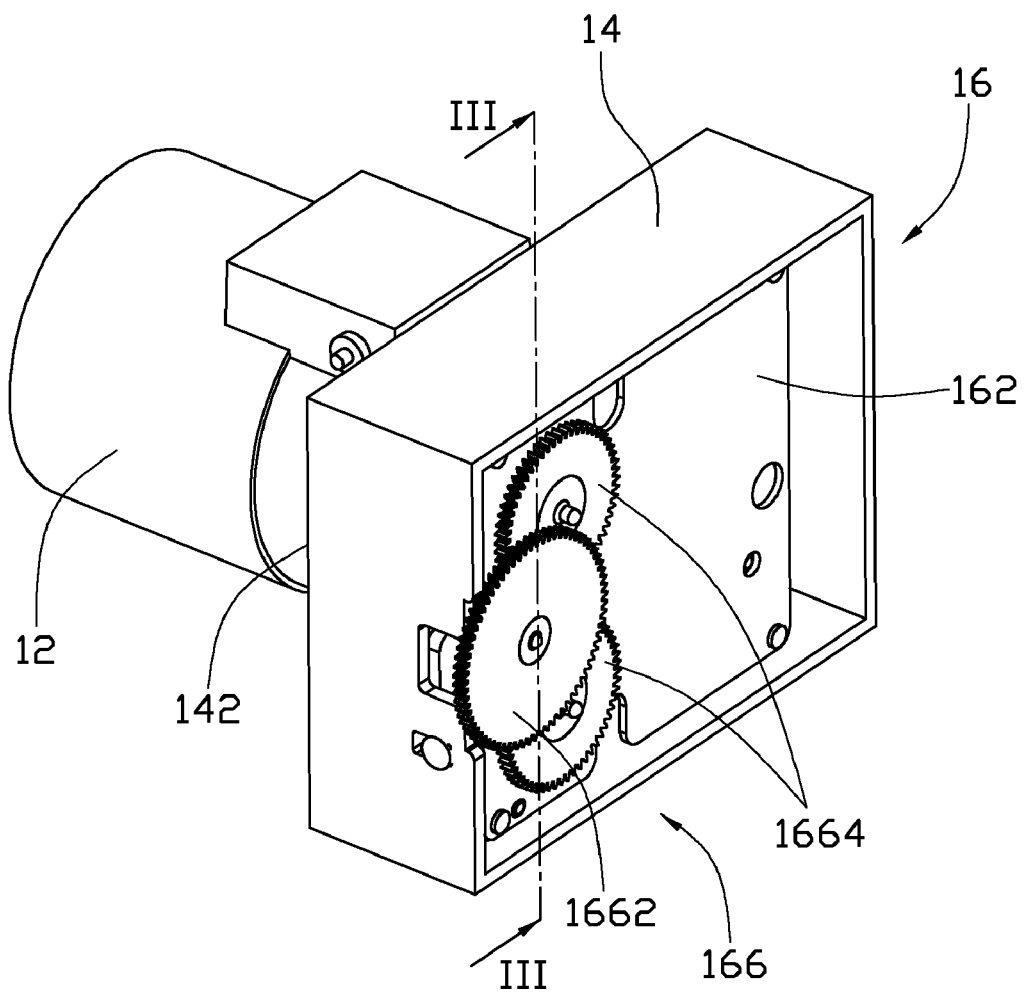
FIG. 2 is a perspective view of the back focus adjustment apparatus in FIG. 1.

Referring to FIGS. 1-2, a back focus adjustment apparatus 10 of a camera in accordance with one embodiment of the disclosure includes a lens module 12, a casing 14, an adjusting module 16 and an image capturing device 18. The lens module 12 is mounted on a bottom surface 142 of the casing 14.

The adjusting module 16 includes a fixed support 162, a movable support 164 and a drive module 166. The fixed support 162 is a plate fixed in the casing 14 opposite to the bottom surface 142. A distance is defined between the fixed support 162 and the bottom surface 142. The movable support 164 is a frame plate arranged between the bottom surface 142 and the fixed support 162. The drive module 166 is defined on the fixed support 162.

The drive module 166 includes an adjustment wheel 1662 and two drive wheels 1664. Two through holes 1640 are defined in the movable support 164. Each of the drive wheels 1664 defines a worm gear 160. The through holes 1640 receive the worm gears 160. The drive module 166 is connected to the movable support 162 through the worm gears 160. Each of the worm gears 160 defines an E-type fastener 168 on the end thereof. The two drive wheels 1664 and the adjustment wheel 1662 are gearingly engaged.

The adjustment wheel 1662 and the drive wheels 1664 are mounted on one side of the fixed support 162. A part of the adjustment wheel 1662 exceeds the fringe of the fixed support 162. Thus, a user can easily turn the adjustment wheel 1662.

The image capturing device 18 includes a substrate 182 and an image sensor 184. The image sensor 184 is mounted on the substrate 182. Circuitry for the image sensor 184 is defined on the substrate 182. The substrate 182 is mounted on the movable support 164. Therefore, the image sensor 184 can face the lens module 12. A guide pin 144 is defined in one side of the casing 14 opposite to the drive module 166. The guide pin 144 passes through the movable support 164 and the substrate 182.

Figure 3:
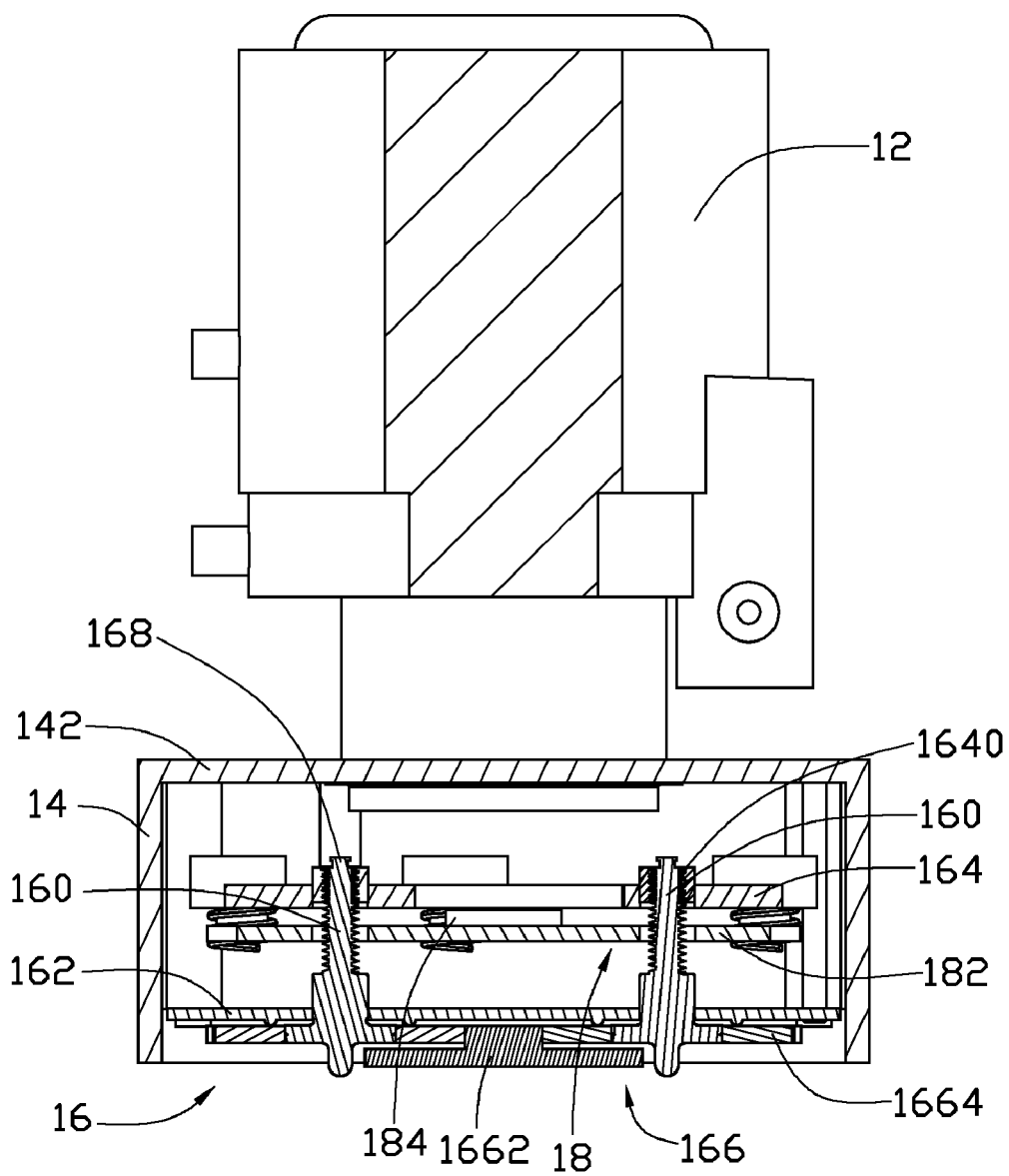
FIG. 3 is a cross-section taken along line III-III of a drive module of the back focus adjustment apparatus in FIG. 2.

Referring to FIG. 3, when the adjustment wheel 1662 is turned, the two drive wheels 1664 will rotate synchronously. Accordingly, the image capturing device 18 on the movable support 164 is moved back and forth relative to the lens module 12 mounted on the bottom surface 142. Thus, the focus on the camera utilizing the back focus adjustment apparatus can be adjusted easily.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A back focus adjustment apparatus of a camera comprising:
   a casing configured for mounting a lens module;
   an adjusting module comprising a fixed support, a movable support and a drive module, the drive module comprising an adjustment wheel and two drive wheels; and
   an image capturing device, the lens module mounted on a bottom surface of the casing, the fixed support fixed in the casing and opposite to the bottom surface thereof, the image capturing device mounted on the movable support, the drive module defined on the fixed support, the drive module connected to the movable support through worm gears defined on the drive wheels, the drive wheels and the adjustment wheel gearingly engaged, the image capturing device moving back and forth according to the adjustment of the adjustment wheel of the adjusting module.

2. The back focus adjustment apparatus of claim 1, wherein a distance is defined between the bottom surface and the fixed support.

3. The back focus adjustment apparatus of claim 1, wherein the movable support is a frame plate and arranged between the bottom surface of the casing and the fixed support.

4. The back focus adjustment apparatus of claim 3, wherein a plurality of through holes is defined in the movable support.

5. The back focus adjustment apparatus of claim 4, wherein worm gears are defined on each of the drive wheels.

6. The back focus adjustment apparatus of claim 5, wherein the adjustment wheel and two drive wheels are arranged on one side of the fixed support.

7. The back focus adjustment apparatus of claim 5, wherein each of the worm gears is with an E-type fastener on the end thereof.

8. The back focus adjustment apparatus of claim 6, wherein the image capturing device comprises a substrate and an image sensor, the image sensor mounted on the substrate.

9. The back focus adjustment apparatus of claim 8, wherein the substrate is mounted on the movable support, the image senor facing the lens module.

10. The back focus adjustment apparatus of claim 9, wherein a guide pin is defined in the casing, the guide pin passing through the movable support and the substrate.

11. The back focus adjustment apparatus of claim 10, wherein the guide pin is defined on a side surface of the casing opposite to the drive module.

12. A back focus adjustment apparatus of a camera comprising:
- an adjusting module comprising an adjustment wheel and a plurality of drive wheels; and
- an image capturing device mounted on a movable support, the movable support connected to the adjusting module through worm gears of the two drive wheels, the drive wheels and the adjustment wheel gearingly engaged, the image capturing device movable during focusing of a lens module of the camera according to the adjustment of the adjustment wheel.

* * * * *